July 3, 1951  J. F. THOMAS  2,559,328
MEASURING DEVICE FOR SHORTENING
Filed Jan. 13, 1950

Inventor
Jesse F. Thomas
By John N. Randolph
Attorney

Patented July 3, 1951

2,559,328

UNITED STATES PATENT OFFICE 2,559,328

MEASURING DEVICE FOR SHORTENING

Jesse F. Thomas, New London, Wis.

Application January 13, 1950, Serial No. 138,379

5 Claims. (Cl. 31—11)

This invention relates to a novel device for extracting a measured amount of shortening, such as lard, butter or other material of substantially the same consistency from a mass and for thereafter ejecting the measured part from the device.

More particularly, it is an aim of the present invention to provide a device which can be readily set to receive different quantities of a solid or semi-solid material such as lard or butter or other material of a similar consistency and which is intended to be pressed into the mass for filling a chamber of the measuring device, which chamber is of variable size, and having means for thereafter cutting off the material within the chamber from the mass before extracting the measuring device from the mass.

Another object of the invention is to provide a measuring device wherein the cutting means utilized for cutting off the mass from the part thereof within the measuring chamber is further utilized for cleaning off an ejecting element of the device after the measured material has been ejected from the measuring chamber.

Still a further and particularly important object of the invention is to provide means for releasing the vacuum created in the mass by the application of the measuring device thereto so that the material within the measuring chamber will not be extracted therefrom by the vacuum within the opening formed by the measuring device as the measuring device is removed from the mass.

Various other objects and advantages of the invention will hereinafter become more fully apparent from the following description of the drawing, illustrating preferred embodiments thereof, and wherein.

Figure 1:
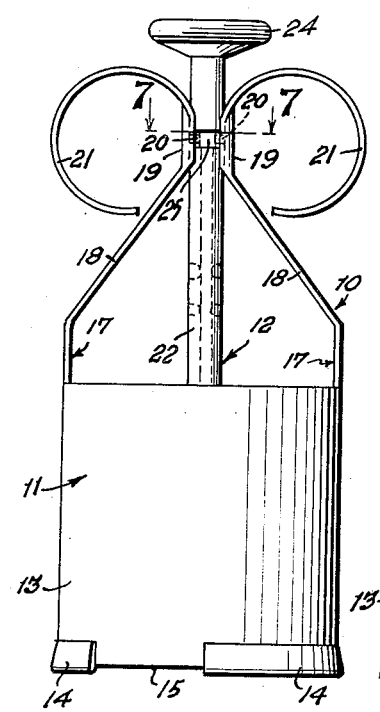
Figure 1 is a side elevational view of the measuring device.

Referring more specifically to the drawing and first with reference to the embodiment of the invention as illustrated in Figures 1 to 7, the measuring device, comprising the invention, is designated generally 10 and includes an outer container section, designated generally 11 and an inner plunger section, designated generally 12.

Figure 7:
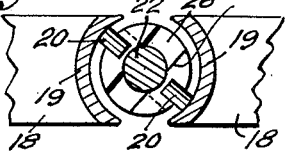
Figure 7 is an enlarged fragmentary cross sectional view taken substantially along a plane as indicated by the line 7—7 of Figure 1.

The container section 11 includes a body 13 of cylindrical cross section internally and of cylindrical cross section externally except for the integral circumferentially spaced external enlargements 14 at the lower end of the body 13 and forming gaps 15 therebetween of a diameter less than that of the enlargements 14, for a purpose which will hereinafter be described. The open lower end of the body 13 is divided into segments by a plurality of bars 16 which are integrally joined at the axis of the body 13 and the outer ends of which are preferably formed integral with the lower end of the body 13. However, the enlargements 14 and bars 16 may be separately secured to the body 13 rather than being molded integral therewith. A pair of strap members 17 project longitudinally from the upper end of the body 13 and are preferably formed integral therewith and are resiliently disposed relatively to said body. The strap members 17 include upwardly converging portions 18 which extend from adjacent the upper end of the body 13 and which terminate in transversely spaced substantially parallel portions 19 which are equally spaced one on either side of a continuation of the axis of the body 13. Said parallel strap portions 19 are of arcuate cross section and as best seen in Figure 7 have inner concave sides which are disposed in opposed relationship. Each of said inner sides is provided with an inwardly extending pin or stud 20, which studs are disposed in alignment, as seen in Figure 7. Beyond the parallel portions 19, the straps 17 terminate in outwardly turned back terminals forming finger loops 21.

Figure 2:
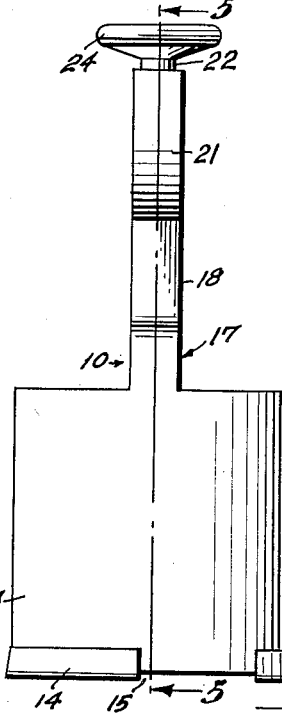
Figure 2 is a side elevational view taken at a right angle to Figure 1.
Figure 3:
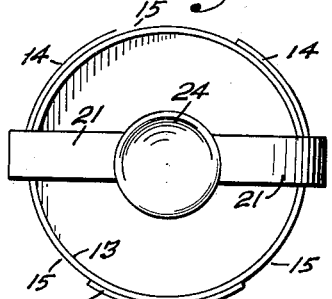
Figure 3 is a top plan view of the device.
Figure 4:
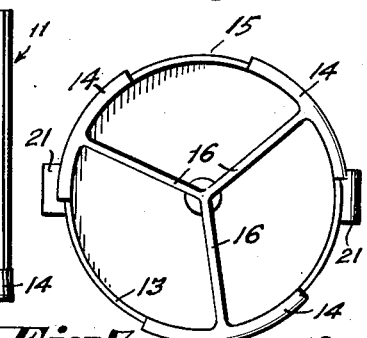
Figure 4 is a bottom plan view thereof.
Figure 5:
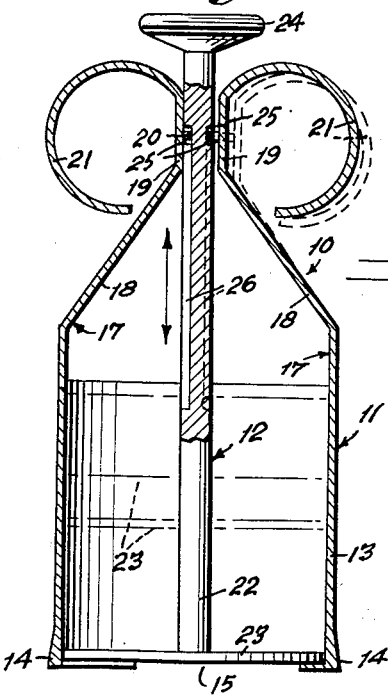
Figure 5 is a substantially central sectional view, partly in side elevation taken substantially along a plane as indicated by the line 5—5 of Figure 2.
Figure 6:
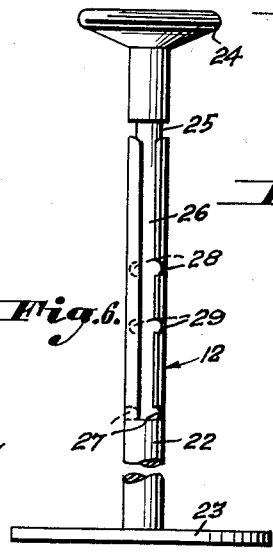
Figure 6 is a side elevational view, broken away, of one section of the device.

The inner plunger section 12 includes a plunger rod 22 having a disk-shaped plunger head 23 at one end thereof and which reciprocally engages in the body 13. The plunger rod 22 projects perpendicularly from the center of the head 23 and is disposed substantially axially of the body 13 and has a knob 24 at its opposite end which is provided with a flat upper or outer surface and which is disposed above the finger loops 21. The plunger rod 22, near its upper end, is provided with an annular groove 25 and has two longitudinally extending, outwardly opening diametrically opposed grooves 26 the upper ends of which open into the groove 25. Each groove 26 is provided at its lower end with a communicating circumferentially extending notch 27 and intermediate of its ends with a similar notch 28. Each groove 26 is also provided with a third notch 29 which is arranged intermediate of the notches 27 and 28. The three notches of each groove 26 extend circumferentially therefrom in the same direction and the corresponding notches of the two grooves 26 are located in diametrically opposite portions of the plunger rod 22. The plunger rod 22 extends upwardly between the strap portions 19 and when the plunger head 23 is in a fully projected position, as illustrated in Figures 1, 2 and 5, so that it is in engagement with the bars 16, the two pins or studs 20 are disposed in engagement with the annular groove 25. Accordingly, in this position of the parts, the plunger section 12 may be revolved by the knob 24 for revolving the plunger head 23 on the bars 16.

If it is desired to extract and measure a quarter of a cup of a material such as lard or butter from a mass of such material, not shown, the plunger rod 22 is manually turned to align the pins 20 with the two grooves 26. The plunger rod 22 may then slide upwardly relatively to the container section 11 with the pins or studs 20 sliding in the grooves 26 until they are in alignment with the notches 28. The plunger rod 22 is then revolved in a direction for moving the pins into engagement with said notches 28. The device may be held in either hand with the index and middle fingers engaging the finger loops 21 and the thumb resting on the knob 24 and the lower end of the body 13 may then be pressed downwardly into the semi-solid or solid mass of lard or other material of a like consistency for filling the bottom portion of the body 13 up to the under side of the plunger head 23. The studs 20 by engagement with the notches 28 retain the head 23 in this pre-set position while the bottom part of the container body is being filled and enables pressure to be applied by the thumb on the knob 24 while forcing the lower end of the container body 13 into the mass. As the container body 13 is forced into the mass its enlargements 14 will form enlarged portions in the recess of the mass which is formed by the container body 13. After the bottom portion of the container body 13 has thus been filled the measuring device 10 is revolved by a twisting pressure exerted thereon through the finger loops 21 to cause the bars 16 to cut off the part of the mass within the bottom of the body 13 from the remainder of the mass so that it can be extracted from the mass with the measuring device. Further, this turning of the body 13 in the mass results in the enlargements 14 enlarging the hole at the bottom of the mass and permits air to enter the hole in the mass through the grooves formed by the enlargements 14 so that when the measuring device 10 is extracted from the mass air can rush in through the longitudinal and circumferential grooves thus formed by the enlargements 14 to eliminate any vacuum which might otherwise be created by extraction of the measuring device 10 with the part of the mass contained within the body 13 so as to prevent any tendency of a vacuum within the hole in the mass extracting any part of the material to be measured from the bottom portion of the container body 13. After the material has been thereby separated from the mass, the plunger rod 22 is again revolved to align the studs 20 with the grooves 26 and a pressure is exerted on the knob 24 for forcing the plunger head 23 back to its position of Figure 5 to thereby eject the separated lard or other material from the lower end of the container body 13. With the parts in their positions of Figure 5, the knob 24 can be revolved so that the bars 16 will scrape off any remaining material from the under or outer side of the plunger head 23. Obviously, the plunger section 12 could be initially positioned with the studs 20 engaging the notches 29 for measuring a third of a cup of lard or other material or in engagement with the lower notches 27 for measuring a half of cup of such material and the operation of the device 10 is exactly the same whether the studs are engaging the notches 28 or the notches 27 or 29.

Figure 8:
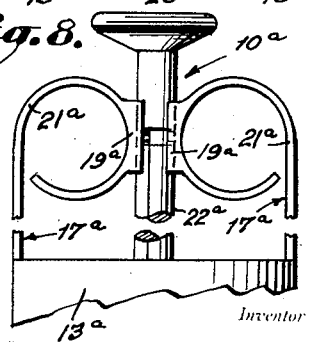
Figure 8 is a fragmentary side elevational view similar to the upper portion of Figure 1 and illustrating a modified form of the invention.

Figure 8 illustrates a slightly different embodiment of the measuring device, the upper portion only of which has been illustrated and which is designated generally 10a. The measuring device 10a differs from the measuring device 10 only in respect to the strap members which are designated generally 17a. The strap members 17a differ from the strap members 17 in that they extend upwardly from the upper end of the container body 13a in substantially parallel relationship and are then turned inwardly and back upon themselves to form corresponding finger loops 21a. Said finger loops 21a have adjacently disposed substantially parallel portions 19a corresponding to the substantially parallel strap portions 19 and having concave inwardly facing sides for engagement around portions of the plunger rod 22a. The strap portions 19a are provided with studs, not shown, corresponding to the studs 20 and which are similarly disposed to said studs 20. The straps 17a, like the straps 17 are also resiliently disposed relatively to the body 13a and normally retained yieldably in their positions of Figure 8. In view of the preceding detailed description of the measuring device 10 and since the measuring device 10a is utilized in exactly the same manner, a further description thereof is considered unnecessary.

The measuring device 10 may be dismantled for cleaning by moving the plunger section 12 to its lowermost position as illustrated in Figure 5 after which the finger loops 21 are yieldably spread apart so that the plunger rod 22 may be displaced laterally out of engagement with the strap portions 19. The plunger rod 22 and the head 23 may then be withdrawn from the body 13 and removed between the straps 17. By reversing this procedure, the measuring device 10 may be reassembled and when the plunger head 23 is located at the bottom of the body 13, the plunger rod 22 may be snapped into position between the strap portions 19. Said straps 17 are resiliently disposed with respect to one another for assembling and disassembling the measuring device. The measuring device 10a may be similarly assembled or disassembled.

Various modifications and changes are contemplated and may obviously be resorted to, without departing from the spirit or scope of the invention as hereinafter defined by the appended claims.

I claim as my invention:

1. A measuring device for lard, butter and other semi-solids of a similar consistency comprising, a container section and a plunger section, said container section including a cylindrical body portion having an open lower end and an open upper end, a plurality of bars extending radially of the open lower end of the body portion and having outer ends connected to the lower end of said body portion, resilient strap members projecting from the upper end of the body portion and secured thereto, said strap members having finger loops disposed in laterally spaced relationship to one another and longitudinally spaced from the upper end of the body portion, said finger loops including adjacently disposed substantially parallel portions having inner sides of concave cross section; said plunger section including a plunger head reciprocally disposed in said body portion for movement longitudinally thereof and having a relatively close fitting engagement with the inner wall of the body portion, a plunger rod fixed to and projecting perpendicularly from the head and extending axially of said body portion, said plunger rod extending reciprocally between the concave faces of the parallel finger loop portions and being provided near its opposite end with an annular groove, said plunger rod having diametrically opposed outwardly opening longitudinally extending grooves having corresponding ends opening into said annular groove and extending therefrom toward the plunger head, each of said longitudinal grooves being provided with a plurality of transversely extending notches, the notches of the two grooves being disposed in diametrically opposite portions of the plunger rod, and studs projecting inwardly from the concave faces of said finger loop portions and disposed in alignment for engaging either the annular groove, said longitudinal grooves or complementary lateral notches of the plunger rod for maintaining the plunger head in a plurality of adjusted positions relatively to the lower end of said container body.

2. A measuring device as in claim 1, said annular groove being disposed to be engaged by the studs when the plunger head is bearing against said bars.

3. A measuring device as in claim 1, and a knob formed on the opposite end of the plunger rod and disposed beyond said finger loops.

4. A measuring device as in claim 1, said body portion having circumferentially spaced external enlargements at its lower end.

5. A measuring device as in claim 1, said finger loops being yieldably displaceable away from one another to disengage the studs from said annular groove and said straps yieldably retaining said studs normally in engagement with the annular groove, longitudinal grooves or corresponding notches of the plunger rod.

JESSE F. THOMAS.

No references cited.